US009460580B1

(12) United States Patent
Glass et al.

(10) Patent No.: US 9,460,580 B1
(45) Date of Patent: Oct. 4, 2016

(54) GIFT CARD HOLDER

(75) Inventors: Brett R. Glass, Overland Park, KS (US); Nicole E. Glass, Overland Park, KS (US)

(73) Assignee: Gift Card Impressions, LLC, Kansas City, MO (US)

( * ) Notice: Subject to any disclaimer, the term of this patent is extended or adjusted under 35 U.S.C. 154(b) by 218 days.

(21) Appl. No.: 12/841,933

(22) Filed: Jul. 22, 2010

Related U.S. Application Data

(60) Provisional application No. 61/228,248, filed on Jul. 24, 2009.

(51) Int. Cl.
*G06K 5/00* (2006.01)
*G07F 7/10* (2006.01)

(52) U.S. Cl.
CPC .................................. *G07F 7/1008* (2013.01)

(58) Field of Classification Search
CPC ...... G07F 7/08; G07F 7/1008; G06Q 20/341
USPC .................................................. 235/380, 486
See application file for complete search history.

(56) References Cited

U.S. PATENT DOCUMENTS 5,791,474 A 8/1998 Hansen
6,224,108 B1 5/2001 Klure
6,619,480 B2 * 9/2003 Smith .......................... 206/555
6,640,974 B2 * 11/2003 Malone ........................ 206/449
7,024,807 B2 * 4/2006 Street ........................ 40/124.06
7,219,829 B2 * 5/2007 Treat .......................... 229/92.8
7,252,225 B2 8/2007 Schultz et al.
7,275,683 B2 10/2007 Lazarowicz et al.
7,290,714 B2 11/2007 Halbur et al.
7,374,095 B2 * 5/2008 Blank et al. ................. 235/486
7,407,093 B2 * 8/2008 Ashby et al. ................ 235/380
7,490,720 B2 2/2009 Cole et al.
7,540,426 B1 6/2009 Gandel et al.
7,614,548 B2 11/2009 Schultz et al.
2006/0151348 A1 * 7/2006 Willard ........................ 206/449
2007/0094901 A1 * 5/2007 Kibbe et al. .............. 40/124.06
2007/0200000 A1 8/2007 Sanders
2007/0262160 A1 * 11/2007 Narlinger et al. ........... 235/493
2008/0116088 A1 5/2008 Roberts
2008/0116089 A1 * 5/2008 Roberts ........................ 206/232
2009/0038968 A1 2/2009 Smith
2009/0091123 A1 * 4/2009 Conley et al. ............... 283/106

OTHER PUBLICATIONS

PRI Plastic Resources Inc., http://www.plasticresource.com/carriers/hanging/standard/c7105/PRI-C-7105.pdf.
Intech Direct, Inc., http://www.intechdirect.com/products/valupak, http://www.intechdirect.com/images/uploads/products/valupakbacksample.jpg.

* cited by examiner

*Primary Examiner* — Rafferty Kelly
(74) *Attorney, Agent, or Firm* — Polsinelli PC

(57) ABSTRACT

A gift card holder including a carrier panel for holding a removably attached gift card and a flap attached forward of the carrier panel to cover and obscure the gift card when the holder is presented for sale. The flap may include decorative elements or information and may include additional flaps or pages to form a greeting card or booklet.

11 Claims, 4 Drawing Sheets

(Prior Art)

GIFT CARD HOLDER

CROSS REFERENCE TO RELATED APPLICATIONS

This application claims the benefit of the prior filed, provisional application Ser. No. 61/228,248, filed Jul. 24, 2009.

BACKGROUND OF THE INVENTION

This invention relates generally to gift cards and more particularly to a device for holding and displaying gift cards while providing indicia and/or audio recordings selected or provided by the purchaser to personalize the gift.

Transaction cards, stored value cards, or gift cards as they are commonly called based upon their intended use, have become popular gifts. Gift cards typically comprise a stored value card whereby a certain cash equivalent value is encoded upon a magnet strip applied to the surface of the card. This stored value may be determined by the vendor prior to packaging and display for sale or, more commonly, is selected at the point of sale by the purchaser and loaded by the cashier using a magnet card reader/writer. While popular, gift cards are typically provided with a generic and impersonal design, typically identifying only the associated merchant for which the card may be used to purchase merchandise, and therefore are not personalized in view of the intended recipient.

Gift cards are often presented for sale on display racks in stores. The cards are typically attached to a carrier panel via removable adhesive or plastic wrap and the carrier panel is hung upon a display stand peg. Alternatively, gift cards may be sold in a packet. A given area of a store will only support a certain number and size of display stands, given store traffic and other considerations, which makes allocation of display space an important marketing decision that may require selecting only certain high selling cards for display. Display of other items in the same store area will typically reduce the substantially finite space available for displaying gift cards.

In addition to the above considerations, gift cards must fit within a set allocated space in pre-existing displays. A gift card carrier panel or packet must not exceed 5.25" tall and 4" wide. These dimensions are an industry standard and are typically non-negotiable. In addition, for gift cards that use barcodes the carrier panel must have a 0.75" tall×3.125" wide die cut window to provide access to the C128 barcode on the gift card when affixed to the carrier. In order to properly hang each gift card, carrier panels or associated hang tags must also include a J-hook hole (sombrero cut) with the exact dimensions of 1.875" wide by 0.5" high and be placed 0.1875" from the top of the carrier panel or hang tag. Presently, the above requirements pertain to approximately 95% of all gift cards that are sold at retail.

What is needed, therefore, particularly among competing gift card purveyors, is a means for distinguishing a gift card line from other lines while not requiring additional display space or displacing gift cards from display. Additionally, gift cards are by their nature a relatively generic gift in that they are selected primarily according to monetary value or denomination and, perhaps, associated vendor. What is further needed is a means to not only distinguish a line of gift cards from among other lines but to personalize the gift of the card to the recipient.

BRIEF DESCRIPTION OF THE INVENTION

The purpose of this invention is to provide a gift card holder that bears indicia for indicating the name of the sender and recipient of the gift card, decorations of various styles or themes, a slot for inserting a gift card into the holder, and means for providing a removable, associated gift card that may be readily accessed by a store cashier for activation. The gift card may be attached to holder carrier panel using removable adhesive so that the card may be removed at the point of purchase for loading with a stored value or activation. Alternatively, the carrier panel may be provided with a horizontal crease or with sufficient flexibility so that it may be bent away from the gift card to expose the gift card magnetic strip for swiping through a magnetic card reader. As a further alternative, a horizontal score may be cut along carrier panel at 1.25" above the lower margin of the attached gift card so that the carrier panel be bent away from the card at the score to provide access to the card magnetic strip. In the case of a gift card encoded using a bar code, the carrier panel may include a window formed in the carrier panel so that the bar code may be accessed and scanned through the back of the carrier panel. Prior to giving the gift card to the gift recipient, the card is installed within a pocket provided in the holder by the gift giver so that the personalized holder is what is first viewed by the gift recipient versus simply a generic gift card.

The gift card holder is specifically designed to enhance the value of a gift card while not taking additional display space, by adhering to industry dimensional standards for gift cards and associated packaging (carrier panels or packets).

The gift card holder typically includes a carrier panel for holding a removably attached gift card via temporary or removable adhesive or other means and a flap attached forward of the carrier panel to cover and obscure the gift card when the holder is presented for sale. The flap may include decorative elements or information and may include additional flaps or pages to form a greeting card or booklet.

One embodiment of a gift card holder may include a relatively planar carrier panel that includes a means such as removable adhesive for holding a gift card to a forward surface of the carrier panel. A presentation portion typically comprising one or more flaps is attached to the carrier panel and is folded over a portion of the forward surface of the panel to obscure the gift card from view when the gift card is attached to the forward portion.

Another embodiment of a gift card holder may include a relatively planar carrier panel having a forward surface, a presentation portion attached to the carrier panel and folded over a portion of the forward surface, and a gift card removably attached to the forward surface so that the presentation portion overlies the gift card. The gift card includes a bar code on its rearward surface and a window in the carrier panel is in alignment with bar code so that the bar code may be viewed through the window.

Another embodiment of a gift card holder may include a relatively planar carrier panel having a forward surface, a presentation portion attached to the carrier panel and folded over a portion of the forward surface, and a gift card removably attached to the forward surface so that the presentation portion overlies the gift card. The gift card includes a magnetic strip on its rearward surface. A crease formed in the carrier panel overlies the rearward surface along a line above the magnetic strip so that the portion of the panel below the crease may be bent away from the rearward surface to reveal the bar code.

Other advantages of the invention will become apparent from the following description taken in connection with the accompanying drawings, wherein is set forth by way of illustration and example an embodiment of the present invention.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
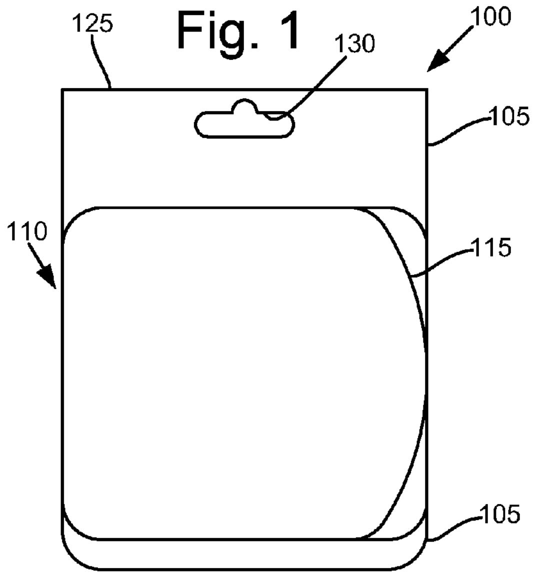
FIG. 1 is a front, elevational view of a gift card holder.

Referring now to FIGS. 1 through 5, there is shown a gift card holder 100 comprising a generally rectangular carrier panel portion 105 and a presentation portion 110 comprising hinged or otherwise articulated front and rear flaps 115 and 120, respectively. The upper portion of the carrier panel 105 may be referred to as a hang tag portion 125 and includes a means for hanging the holder 100 upon a display stand peg such as a typical J-hook peg (not shown). The means for hanging may comprise a sombrero cut aperture 130 in the hang tag portion 125 of the carrier panel 105. In order to comply with present industry standards, the aperture 130 is preferably cut or otherwise formed to the exact dimensions of 1.875" wide by 0.5" high with the upper margin of the aperture placed 0.1875" from the top edge of the carrier. It should be appreciated the other means for hanging the holder 100 may be employed to meet changing standards or to fit non-standard displays. FIG. 1 is a front, elevational view of a gift card holder 100 in the orientation in which it would be hung and displayed upon a display stand.

Figure 2:
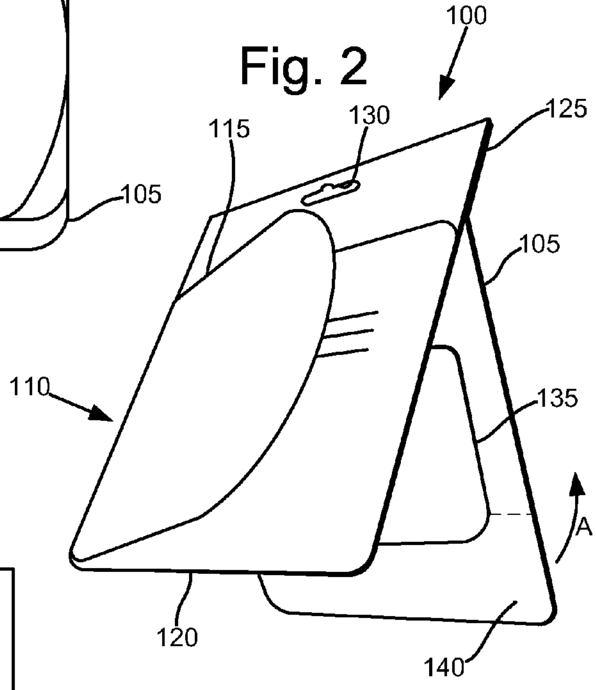
FIG. 2 is a view of the holder of FIG. 1 showing the two flaps of the presentation portion of the holder lifted away from the carrier panel to reveal the gift card removably mounted thereon.

FIG. 2 is a view of the holder 100 of FIG. 1 showing the front flap 115 slightly lifted away from the rear flap 120 and the presentation portion 110 of the holder 100 lifted partially away from the carrier panel 105 to reveal a gift card 135 removably mounted thereon. As shown, the gift card 135 is typically removably attached to the front surface 140 of the carrier panel 105.

Figure 3:
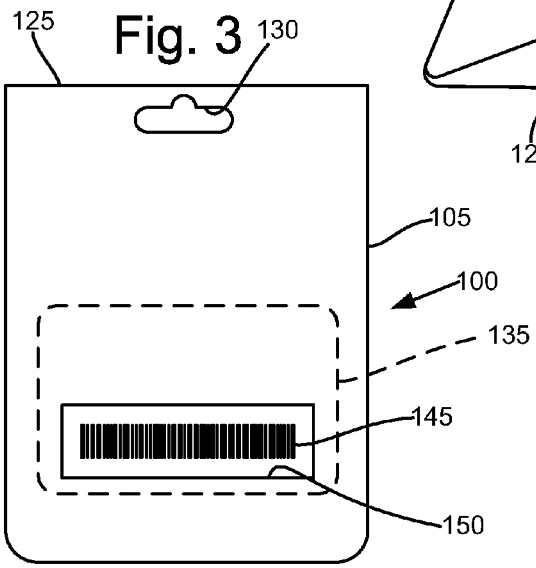
FIG. 3 is a rear, elevational view of the holder illustrating the bar code imprinted on the back of a gift card showing through an aperture formed in the carrier panel.

FIG. 3 is a rear, elevational view of the holder 100. As shown, the carrier panel 105 is provided with a window 150 through which a portion of the gift card 135 bearing a bar code 145 may be viewed and scanned without removal of the gift card 135 from the carrier panel 105. The gift card 135 is primarily shown via phantom lines in FIG. 3, with only the portion immediately proximate the bar code 145 visible through the window 150. To comply with present industry standards, gift cards that use barcodes 145 have a 0.75" tall×3.125" wide die cut window 150 in the carrier panel 105 to provide access to the C128 barcode 145.

Figure 4:
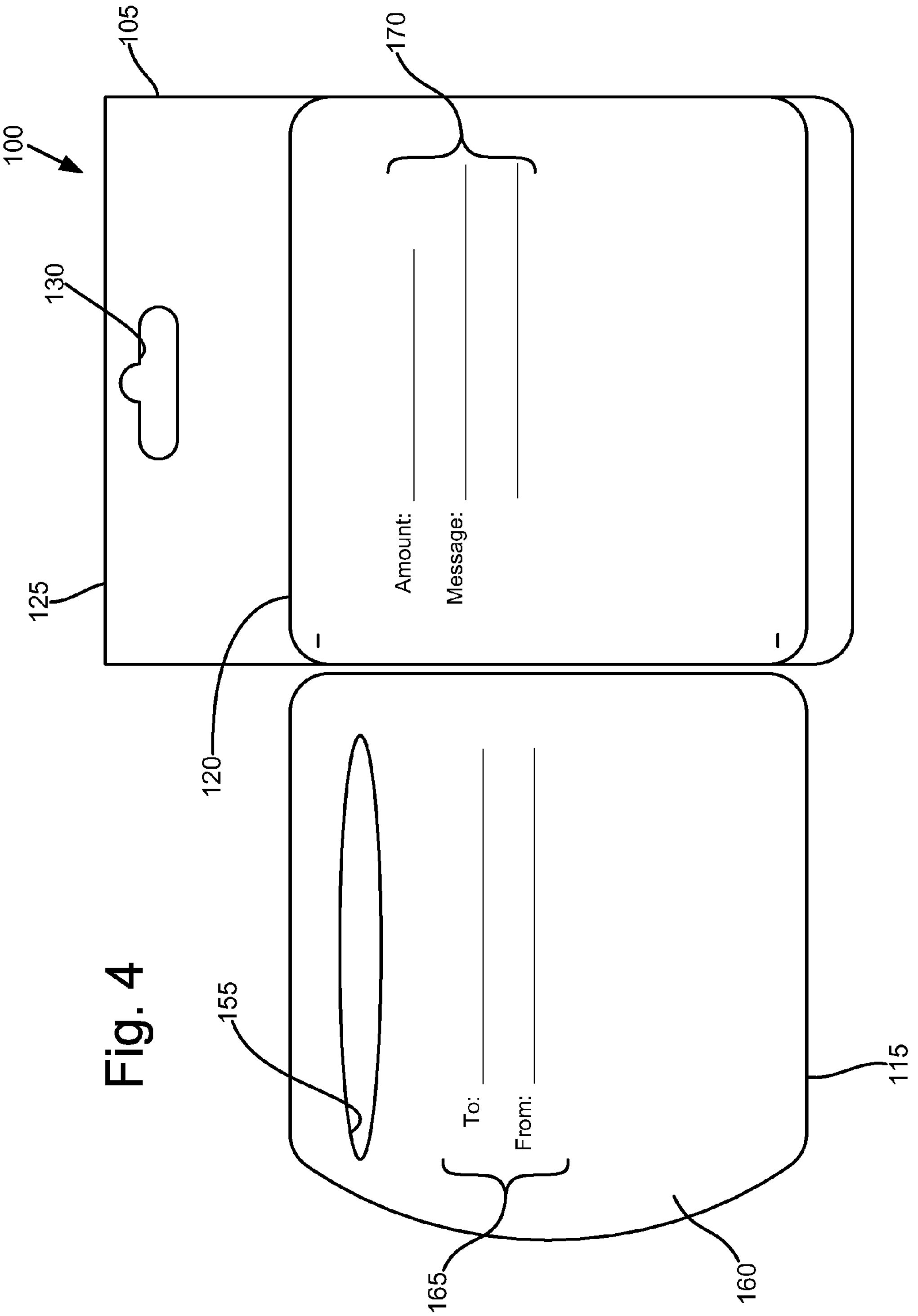
FIG. 4 is an elevational view of the holder showing the front flap of the presentation portion of the holder opened to reveal the slot formed in the inner wall of the front flap for receiving a gift card into a pocket enclosed therein.

FIG. 4 is an elevational view of the holder 100 showing the front flap 115 of the presentation portion 110 of the holder 100 opened to reveal a slot 155 formed in the inner wall 160 of the front flap 115 for receiving the 135 gift card into a pocket enclosed therein. The pocket is for receiving and holding a gift card 135 after activation/loading of the gift card 135 and prior to presentation of the gift card 135 and holder 100 by the gift giver to the gift recipient.

Indicia on the inside surfaces of the holder 100 may be provided to indicate the identity of the gift giver and recipient, i.e. "to/from" indicia 165. Any of the viewable surfaces of the presentation portion 110 or carrier panel 105 may include any desired text, graphic designs or further indicia such as indicia 170 including lines for the gift giver to write upon to indicate gift card monetary value and to provide a message to the recipient.

Figure 5:
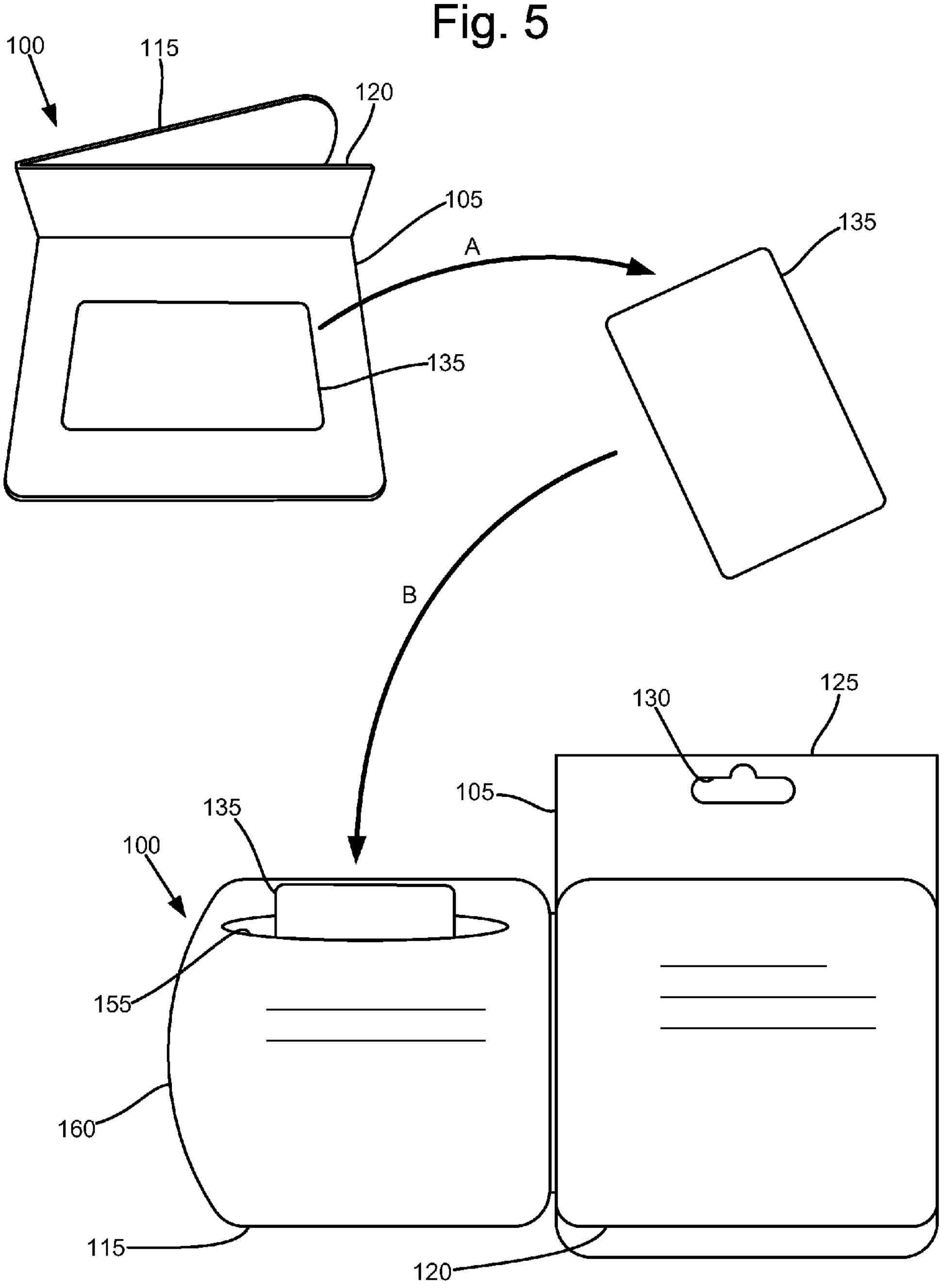
FIG. 5 is a diagram illustrating removal of a gift card from the carrier panel of a holder and repositioning of the card within the holder pocket.

FIG. 5 is a diagram illustrating removal (see arrow A) of a gift card 135 from the carrier panel 105 and repositioning (see arrow B) the card 135 within the slot 155 and holder pocket prior to presenting the holder 100 and installed gift card 135 to the gift recipient.

As an alternative to bar code encoding, the gift card 135 may include a magnetic strip for storing a selected stored value and other information. In one embodiment, at the point of sale the card 135 is detached from the carrier panel 105 and the magnetic strip is loaded with a selected stored value by passing the card 135 through a magnetic strip reader equipped with appropriate software and hardware for completing the transaction. In a preferred embodiment, a horizontal crease or score is placed along the carrier panel at approximately 1.25" from the bottom of the gift card 135 so that the carrier panel may be bent away from the card 135 at the crease or score to expose the magnetic strip for scanning/swiping without the need to remove the card 135 from the carrier panel 105.

Figure 6:
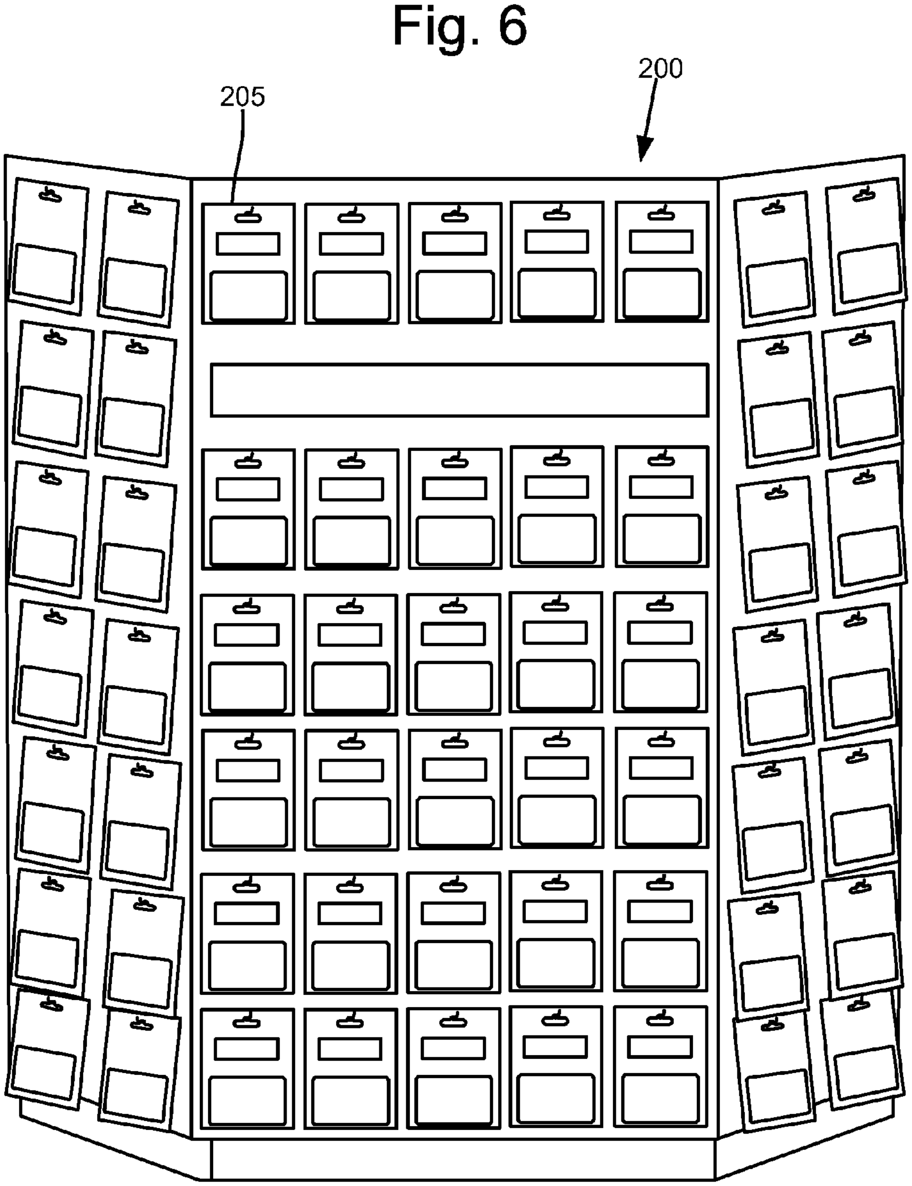
FIG. 6 is an image of a display rack of the prior art arrayed with gift card packs.

Gift cards 135 are often presented for sale on display racks in stores. A typical display rack 200 arrayed with gift card packs 205 in the prior art is shown in FIG. 6. Gift cards 135 are typically simply attached to a carrier panel or packet and hung upon J-hooks. A gift card 135 and its carrier must fit within a set allocated space on the display rack 200. More specifically, a gift card 135 carrier must not exceed 5.25" tall and 4" wide. These dimensions are an industry standard and are typically non-negotiable.

The gift card holder 100 of the present invention is specifically designed to enhance the value of a gift card 135 by adding a presentation portion 110, while not taking any additional viewable display space on the display rack 200. This is achieved by providing a holder 100 that provides the added value of a presentation portion 110, while still providing accessibility to the gift card 135 at the point of sale via the carrier panel 105, with the entire holder 100 assembly remaining within the standardized size constraints already in effect upon gift cards 135 and carrier panels in the prior art.

Further alternative embodiments include a gift card holder 100 in which the presentation portion 110 may be torn from the hang tag portion 125 along a line of perforations therebetween, and a gift card holder 100 including audio record and playback functionality as disclosed in patent application Ser. No. 61/183,891, hereby incorporated by reference.

The holder 100 components may comprise cardboard, heavy paper, plastic, foam board or any sufficiently resilient material.

Having thus described the invention, what is claimed as new and desired to be secured by Letters Patent is:

1. A gift card holder comprising:

a relatively planar carrier panel, said carrier panel including means for holding a gift card to a forward surface of said carrier panel, a removable presentation portion attached to said carrier panel and folded over a portion of said forward surface, said presentation portion comprising a front flap hingedly engaged to a rear flap, said presentation portion obscuring said gift card from view when said gift card is attached to said forward portion, said presentation portion including means for receiving and holding said gift card within said presentation portion, following removal of said gift card from said forward surface, said presentation portion removable from said carrier panel wherein the front flap and the rear flap of the presentation portion are hingedly engaged at a first fold; and wherein the carrier panel is hingedly engaged to the presentation portion by a second fold and wherein the first and second folds are perpendicular to one another.

2. The gift card holder of claim 1 wherein said presentation portion includes a pocket for receiving and holding said gift card.

3. The gift card holder of claim 2 wherein said presentation portion includes a pocket for receiving and holding said gift card after activation or loading of said gift card.

4. The gift card holder of claim 1 wherein said means for receiving and holding said gift card within said presentation portion comprises a pocket within said front flap.

5. A gift card holder comprising:

a relatively planar carrier panel having a forward surface, a presentation portion comprising a front flap hingedly engaged to a rear flap; where the presentation portion is removeably engaged to said carrier panel and obscuring a portion of said forward surface, a gift card attached to said forward surface whereby said presentation portion overlies said gift card, said gift card including a bar code on a rearward surface thereof, said presentation portion including means for receiving and holding said gift card within said presentation portion, a window in said carrier panel in alignment with said bar code, whereby said bar code may be viewed through said window wherein the front flap and the rear flap of the presentation portion are hingedly engaged at a first fold; and wherein the carrier panel is hingedly engaged to the presentation portion by a second fold and wherein the first and second folds are perpendicular to one another.

6. The gift card holder of claim 5 wherein said carrier panel includes a hang tag portion, said presentation portion removable from said hang tag portion along a line of perforations therebetween.

7. The gift card holder of claim 5 wherein said front flap comprises an inner wall and an outer wall, said front flap including a slot and defining a pocket for receiving and holding said gift card between said inner wall and said outer wall.

8. A gift card holder comprising:

a relatively planar carrier panel having a forward surface, a presentation portion comprising a front flap hingedly engaged to a rear flap; where the presentation portion is removeably engaged to said carrier panel and obscuring a portion of said forward surface, said presentation portion including means for receiving and holding said gift card within said presentation portion, a gift card attached to said forward surface whereby said presentation portion overlies said gift card, said gift card including a magnetic strip on a rearward surface thereof, a crease formed in said carrier panel to overlie said rearward surface along a line above said magnetic strip whereby said carrier panel may be bent away from said gift card at said crease to thereby expose said magnetic strip wherein the front flap and the rear flap of the presentation portion are hingedly engaged at a first fold; and wherein the carrier panel is hingedly engaged to the presentation portion by a second fold and wherein the first and second folds are perpendicular to one another.

9. The gift card holder of claim 8 wherein said presentation portion includes means for receiving and holding said gift card within said presentation portion.

10. The gift card holder of claim 8 wherein said carrier panel includes a hang tag portion, said presentation portion removable from said hang tag portion along a line of perforations therebetween.

11. The gift card holder of claim 8 wherein said presentation portion comprises a hinged front flap and rear flap, said front flap including a pocket for receiving and holding said gift card.

* * * * *